(12) United States Patent
Dai (10) Patent No.: US 11,449,558 B2
(45) Date of Patent: Sep. 20, 2022

(54) RELATIONSHIP NETWORK GENERATION METHOD AND DEVICE, ELECTRONIC APPARATUS, AND STORAGE MEDIUM

(71) Applicant: Beijing Baidu Netcom Science And Technology Co Ltd, Beijing (CN)

(72) Inventor: Mingyang Dai, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/208,211

(22) Filed: Mar. 22, 2021

(65) Prior Publication Data

US 2021/0209166 A1    Jul. 8, 2021

(30) Foreign Application Priority Data

Sep. 27, 2020    (CN) .......................... 202011034030.6

(51) Int. Cl.
  *G06F 16/9035* (2019.01)
  *G06F 16/906* (2019.01)
  *G06F 16/9038* (2019.01)
  *G06F 16/9536* (2019.01)
  *G06F 16/901* (2019.01)

(52) U.S. Cl.
  CPC ........ *G06F 16/9035* (2019.01); *G06F 16/906* (2019.01); *G06F 16/9024* (2019.01); *G06F 16/9038* (2019.01); *G06F 16/9536* (2019.01)

(58) Field of Classification Search
  CPC ............. G06F 16/9035; G06F 16/9038; G06F 16/906; G06F 16/9536; G06F 16/9024

USPC ......................................................... 707/734
  See application file for complete search history.

(56) References Cited

U.S. PATENT DOCUMENTS

| 2015/0262069 | A1 | 9/2015 | Gabriel et al. |
| 2018/0121434 | A1* | 5/2018 | Jiang ................ G06F 16/24578 |
| 2020/0097604 | A1* | 3/2020 | Lee ...................... G06N 3/0445 |

FOREIGN PATENT DOCUMENTS

| JP | 2018502369 A | 1/2018 |
| JP | 2019530057 A | 10/2019 |

OTHER PUBLICATIONS

Zhang, Zhengyan, et al., "ERNIE: Enhanced Language Representation with Informative Entities", arXiv, Cornell University, document id arXiv:1905.07129v3, Jun. 4, 2019, 11 pages.*

(Continued)

*Primary Examiner* — Robert Stevens
(74) *Attorney, Agent, or Firm* — Akerman LLP (57) ABSTRACT

A relationship network generation method and device, electronic apparatus, and a storage medium are provided, which are related to big data processing. In an implementation, at least one historical text data corresponding to N users within a preset duration is acquired, where N is an integer greater than or equal to 1; sampling is performed on at least one historical text data corresponding to the N users to obtain the sampled text data respectively corresponding to the N users; semantic vectors corresponding to the N users respectively are determined based on the sampled text data corresponding to the N users respectively, and a semantic relationship network involving the N users is generated based on the semantic vectors corresponding to the N users respectively.

15 Claims, 5 Drawing Sheets

(56) References Cited

OTHER PUBLICATIONS

Shieh, Jyh-Ren, et al., "Incorporating Multi-Partite Networks and Expertise to Construct Related-Term Graphs", ICDMW 2010, Sydney, NSW, Australia, Dec. 13, 2010, pp. 535-542.*
Extended European Search Report dated Apr. 20, 2021 in connection with corresponding European Patent Application No. 21164578.3, 9 pages.
Notice of Reasons for Refusal dated Jun. 16, 2022 in connection with corresponding Japanese Patent Application No. 2021-076983, 11 pages.

* cited by examiner

RELATIONSHIP NETWORK GENERATION METHOD AND DEVICE, ELECTRONIC APPARATUS, AND STORAGE MEDIUM

CROSS-REFERENCE TO RELATED APPLICATIONS

This application claims priority to Chinese patent application, No. 202011034030.6, entitled "Relationship Network Generation Method and Device, Electronic Apparatus, and Storage Medium", filed with the Chinese Patent Office on Sep. 27, 2020, which is hereby incorporated by reference in its entirety.

TECHNICAL FIELD

The present application relates to a field of computer technologies, and in particular, to a field of big data processing.

BACKGROUND

Understanding of relationships of a user is an important dimension to characterize the user. In the related art, the relationship network of the user is established. In the relationship network of the user, a user node for integrating the text information of the user into the relationship network is used as an attribute of the node.

SUMMARY

The present application discloses a relationship network generation method and device, an electronic apparatus, and a storage medium.

According to an aspect of the present application, a relationship network generation method is provided. The method includes:

acquiring at least one historical text data corresponding to N users within a preset duration, wherein N is an integer greater than or equal to 1;

performing sampling on at least one historical text data corresponding to the N users to obtain sampled text data corresponding to the N users; and determining semantic vectors corresponding to the N users respectively based on the sampled text data corresponding to the N users respectively, and generating a semantic relationship network involving the N users based on the semantic vectors corresponding to the N users respectively.

According to another aspect of the present application, a relationship network generation device is provided. The device includes:

an acquiring module, configured to acquire at least one historical text data corresponding to N users within a preset duration, wherein N is an integer greater than or equal to 1;

a sampling module, configured to perform sampling on at least one historical text data corresponding to the N users to obtain sampled text data corresponding to the N users; and a network generation module, configured to determine semantic vectors corresponding to the N users respectively based on the sampled text data corresponding to the N users respectively, and generate a semantic relationship network involving the N users based on the semantic vectors corresponding to the N users respectively.

According to an aspect of the present application, electronic apparatus is provided. The electronic apparatus includes:

at least one processor; and a memory communicatively connected to the at least one processor, wherein the memory stores instructions executable by the at least one processor, the instructions are executed by the at least one processor to enable the at least one processor to perform the above method.

According to an aspect of the present application, there is provided a non-transitory computer readable storage medium for storing computer instructions, wherein the computer instructions, when executed by a computer, cause the computer to implement the above method.

It shall be understood that the content described in this part is not intended to limit the scope of the present application. Other features of the present application will be easily understood by the following description.

BRIEF DESCRIPTION OF THE DRAWINGS

The accompanying drawings are used to understand the solution well, and do not constitute a limitation to the present application, wherein.

DETAILED DESCRIPTION

The exemplary embodiments of the present application are described in conjunction with the accompanying drawings, including various details of the embodiments of the present application to facilitate understanding; and they shall be regarded as exemplary only. Therefore, those ordinarily skilled in the art shall recognize that various changes and modifications can be made to the embodiments described herein without departing from the scope and spirit of the present application. Similarly, for clarity and conciseness, descriptions of well-known functions and structures are omitted in the following description.

Figure 1:
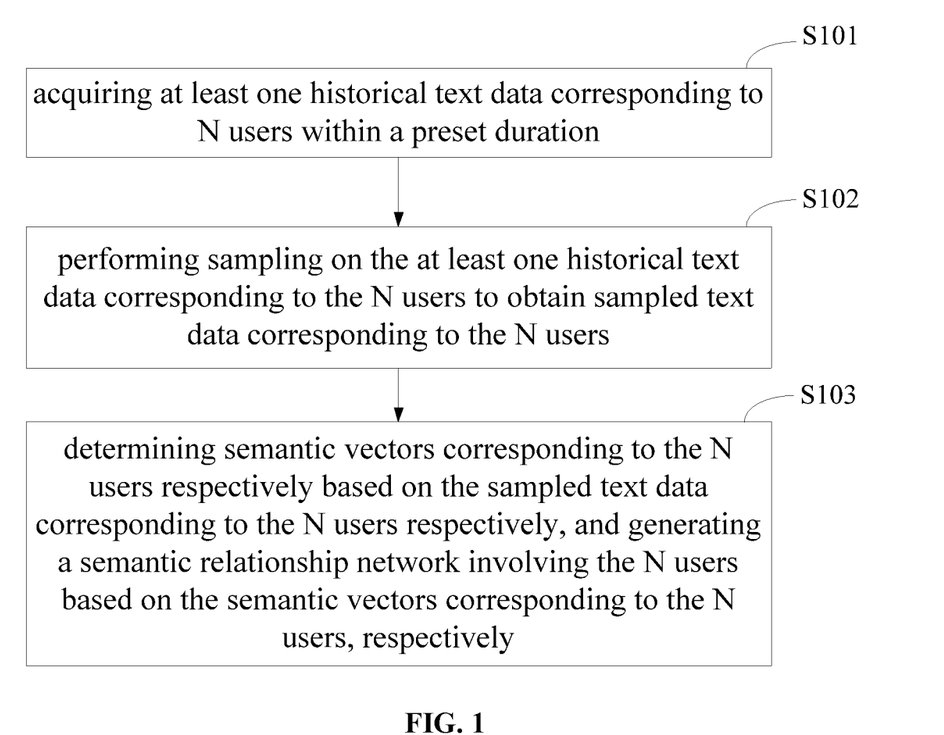
FIG. 1 is a flowchart I of a relationship network generation method according to an embodiment of the present application.

The first embodiment of the present application provides a relationship network generation method. As shown in FIG. 1, the method includes:

S101: acquiring at least one historical text data corresponding to N users within a preset duration, wherein N is an integer greater than or equal to 1;

S102: performing sampling on the at least one historical text data corresponding to the N users to obtain sampled text data corresponding to the N users;

S103: determining semantic vectors corresponding to the N users respectively based on the sampled text data corresponding to the N users respectively, and generating a semantic relationship network involving the N users based on the semantic vectors corresponding to the N users, respectively.

In this embodiment, the N users may be all users currently available.

At least one historical text data may be all historical text data of each of the N users within the preset duration. It shall be understood that the amounts of historical text data for different users may be different.

The at least one historical text data includes query and title; each historical text data may be query or title.

The query may the search information entered by the user in a search engine. For example, if "XXX TV play" is entered in the search engine, this information is used as an item of query of the user.

The title may be the theme or title of a web page opened by the user, namely title.

The preset duration may be set according to actual conditions, for example, the preset duration may be 1 year, 2 years, or other lengths of duration, which is not exhaustive here.

The operation of performing sampling on at least one historical text data may specifically include: performing sampling on at least one historical text data of each of the N users to obtain sampled text data of each of the N users.

That is, one user may have a plurality of pieces of historical text data. Through the above processing, part of the historical text data may be acquired from the historical text data of the user within the preset duration as the sampled text data required for subsequent processing. For example, one user has 1000 pieces of historical text data in one year. 100 pieces of text data may be acquired as the final sampled text data by performing sampling on the historical text data. Here, the number of pieces of sampled text data acquired from the historical text data may be set according to actual needs. For example, it may be set to 10 only, or it may be set to 100, and etc, as long as it may ensure that the number of pieces of the sampled text data of each user is less than that of pieces of the historical text data of the user.

Vectorization is performed on the sampled text data corresponding to each of the N users, to obtain a sentence vector of each sampled text data; the sentence vector corresponding to each user is generated based on the sentence vector of each sampled text data. Here, each user may correspond to one semantic vector.

Figure 2:
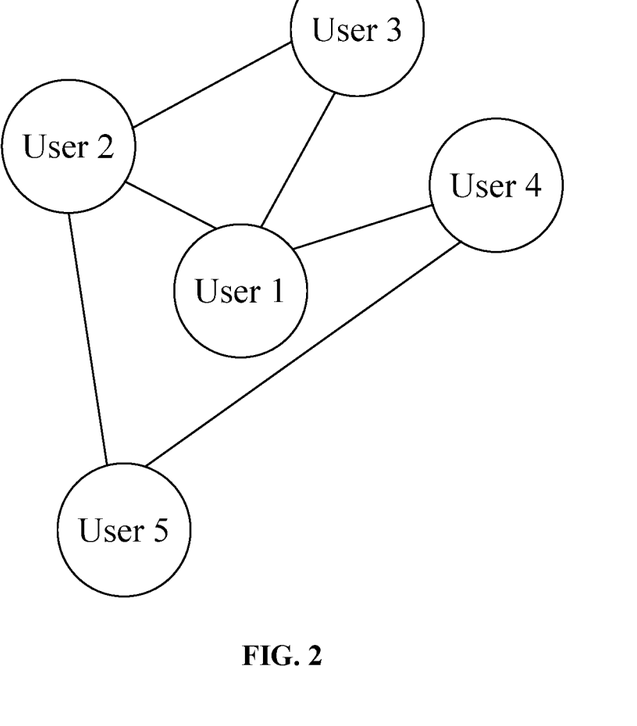
FIG. 2 is a schematic diagram of a relationship network according to an embodiment of the present application.

The semantic relationship network involving the N users is generated based on the semantic vector of each of the N users. Firstly, the relationship network of the users is described here, which may specifically be: taking each of the N users as a node, and taking interaction behaviors between the users as sides to form a relationship network. For example, referring to FIG. 2, N is equal to 5, namely, users 1-5 are taken as nodes in the relationship network, and corresponding sides are established between users with interactive behaviors. Taking user 1 in FIG. 2 as an example, if user 1 has interactive behaviors with user 2, user 3 and user 4, then a side between user 1 and user 2, a side between user 1 and user 3, and a side between user 1 and user 4 are established. The manner for establishing sides between other users is similar and will not be repeated. Finally, the relationship network of 5 users as shown in FIG. 2 may be obtained. It shall be understood that FIG. 2 is only an exemplary illustration, and the relationship network of 5 users is shown. N may be a larger number in actual processing, for example, it may be 10,000 users or 100,000 users, which will not be exhaustive in this embodiment.

Through the above processing, in this embodiment, the semantic vector is added to the representation of each user. Thus, the relationship network established based on each user representation comprising the semantic vector is regarded as the semantic relationship network, namely, the semantic information of the user may be represented in the relationship network.

It can be seen that through the above processing, sampling of the text data in a large amount of historical text data of the user within the preset duration may be performed, the information of the user in a long time range can be covered; and the semantic vector of the user is generated based on the sampled text data. In this way, the calculation amount of text vectorization can be reduced effectively, while the long-term semantic information of the user can be retained; the distinction between users can be reflected effectively, so that the finally established semantic relationship network can represent the semantic information of the user and ensure that the distinction of each user is reflected in the semantic relationship network.

Figure 3:
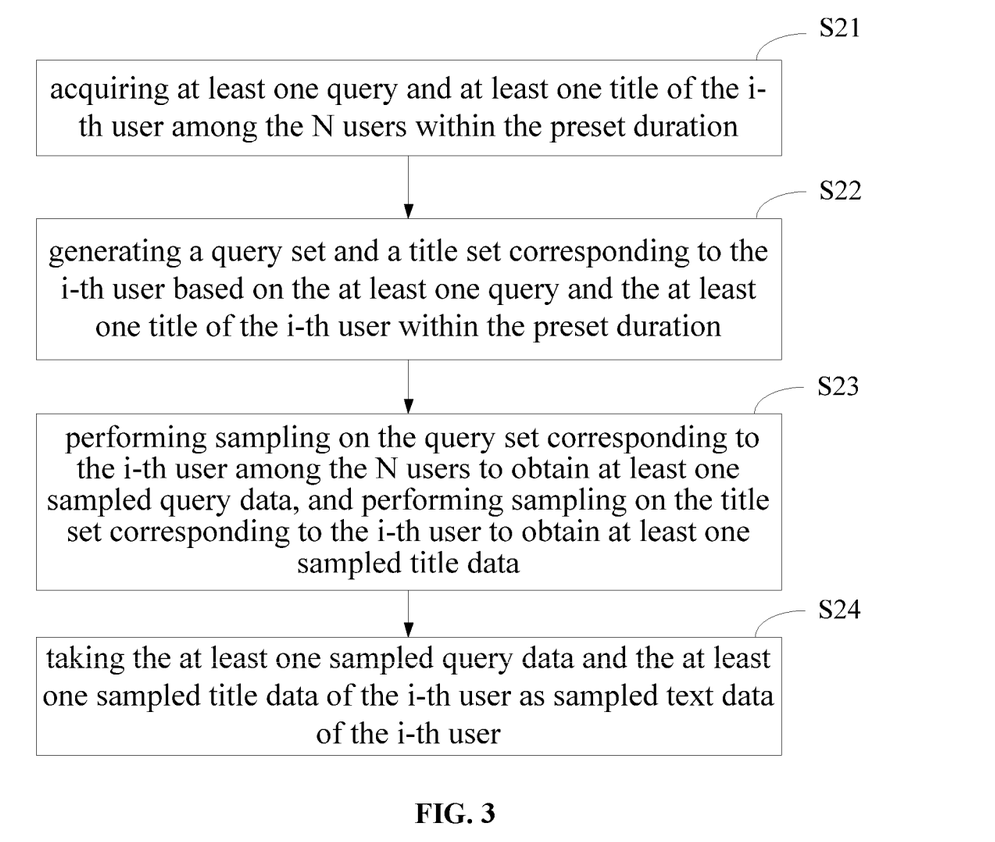
FIG. 3 is a schematic diagram of a sampling processing flow according to an embodiment of the present application.

In the second embodiment of the present application, at least one historical text data includes: query and title;

Correspondingly, as shown in FIG. 3, the method further includes:

S21: acquiring at least one query and at least one title of an i-th user among the N users within the preset duration, wherein i is an integer greater than or equal to 1 and less than or equal to N;

S22: generating a query set and a title set corresponding to the i-th user based on the at least one query and the at least one title of the i-th user within the preset duration.

Here, the i-th user is any one of the N users, that is, any one of all users can be processed by the above solution. It is referred to as the i-th user in this embodiment. The processing of other users is the same as that of the i-th user, and will not be repeated here.

Each historical text data may specifically be query or title.

The query may the search information entered by the user in the search engine. For example, if "XXX TV play" is entered in the search engine, the information is taken as an item of query of the user.

The title may be the theme or title information of a web page opened by the user, namely title. The preset duration has been explained in the first embodiment. The duration may be set according to actual conditions, for example, 1 year.

At least one query and at least one title of the i-th user within the preset duration may form the historical text data of the i-th user within the preset duration.

Furthermore, the operation of generating the query set and the title set corresponding to the i-th user based on at least one query and at least one title of the i-th user within the preset duration further includes:

performing normalization on at least one query of the i-th user within the preset duration to obtain at least one normalized query; performing the normalization on at least one title of the i-th user in the preset duration to obtain at least one normalized title;

generating the title set of the i-th user based on the at least one normalized title, and generating the query set of the i-th user based on the at least one normalized query.

Wherein the normalization processing may specifically be removing spaces and punctuations from the query, and then combining the query with remaining queries with the same content. During the combining process, the number of occurrences of the query is recorded. For example, the user enters "XXX TV play" in one search, and enters "XXX TV play?" in another search. After the normalization, the same query is obtained, namely, "XXX TV play". At this time, the number of occurrences of the query is recorded as 2.

The normalization of the title is similar to the above normalization of the query, and thus will not be repeated here. Similarly, the number of occurrences of the title may be recorded.

Thus, statistics of the historical text data within the preset duration may be performed for each of the N users, so that the information meaning of the finally obtained semantic vector covers the long-time information, thereby improving the accuracy of the meaning of the semantic vector.

After completing the above processing, referring to FIG. 3, the operation of performing sampling on at least one historical text data corresponding to the N users to obtain sampled text data corresponding to the N users may specifically include:

S23: performing sampling on the query set corresponding to the i-th user among the N users to obtain at least one sampled query data, and performing sampling on the title set corresponding to the i-th user to obtain at least one sampled title data;

S24: taking at least one sampled query data and at least one sampled title data of the i-th user as the sampled text data of the i-th user.

Specifically, sampling of the at least one query in the query set of the i-th user may be performed in a frequency-based sampling manner or in a time-based sampling manner; and/or sampling of the at least one title in the title set of the i-th user may be performed in a frequency-based sampling manner or in a time-based sampling manner.

That is, the final text data may include the sampled query data or the sampled title data.

The query set may include L queries; the final sampled query data may include k pieces of sampled query data, where k is less than L.

The title set may include P titles; the final sampled title data may include j pieces of sampled query data, where j is less than P.

The above L and P may be different from each other or may be the same; j and k may be different from each other or may be the same; the values of j and k may be set according to the actual situation; which is not exhaustive.

That is, the number of pieces of the sampled text data is smaller than that of pieces of the historical text data, so that it is not necessary to perform subsequent vectorization on all historical text data, thus reducing the amount of data to be subjected to vectorization.

The operation of performing sampling on the query set corresponding to the i-th user among the N users to obtain at least one sampled query data includes:

calculating, based on a number of occurrences of a query in the query set of the i-th user among the N users and a random number, a frequency sampling score corresponding to the query, and selecting top K queries with largest frequency sampling scores as the at least one sampled query data, where K is an integer greater than or equal to 1;

and/or, acquiring a time stamp of the query in the query set of the i-th user among the N users and a time difference at a current moment, calculating, based on the time difference and the random number, a time sampling score corresponding to the query, and selecting top L queries with smallest time sampling scores as the at least one sampled query data, where L is an integer greater than or equal to 1.

The manner for obtaining the number of occurrences of the query has been described in the above embodiment, and the description will not be repeated.

The design principle of the frequency-based sampling is: the query searched frequently by the user has a higher probability of being sampled, while the query that has been searched for once or twice by the user cannot be discarded.

Specifically, the following formula may be used:

$$\text{Score\_tf} = \text{random}(0,1) * \text{count}(\text{query});$$

where $\text{random}(0, 1)$ is a random number from 0 to 1; $\text{count}(\ )$ refers to the number of times corresponding to a certain query; and $\text{Score\_tf}$ represents the frequency sampling score.

The frequency sampling score of each query may be calculated based on the above formula; then the top K queries with the highest frequency sampling scores may be selected as at least one final sampled query data.

Further, a random number is used in the above process of calculating the frequency sampling score of each query; the random number is any value from 0 to 1; when the final frequency sampling score is calculated, the frequency sampling score of a query with a larger number of occurrences is not necessarily higher than the frequency sampling score of a query with a smaller number of occurrences, so that the probability of the query searched frequently by the user being sampled is higher, while the query searched for once or twice by the user can still be retained, so that the finally used sampled query data can represent the voice information of the user as much as possible, thereby improving the distinction between the users.

The design principle of the time-based sampling is: the query recently searched by the user has a higher probability of being sampled, while the query searched by the user long ago cannot be discarded. Specifically, the following formula can be used for calculation:

$$\text{Score\_time} = \text{random}(0,1) * (\text{cur\_time} - \text{query\_time})$$

$\text{cur\_time}$ may be a current moment, or may be a time stamp corresponding to a current sampling time; $\text{query\_time}$ is a time stamp of the query; $\text{Score\_time}$ is a time sampling score.

It shall be noted here that $\text{query\_time}$ is the time stamp of the query. If a certain query appears only once, the time stamp is the moment when the query appears; if a certain query appears for twice or more times, $\text{query\_time}$ refers to the time stamp corresponding to the time when the query is recorded for the last time, namely, the recent time stamp.

The time sampling score of each query may be calculated based on the above formula, and then top L queries with smallest frequency sampling scores may be selected as at least one final sampled query data.

The above K and L may be the same or different, and both may be set according to actual conditions. For example, both K and L may be set to a first preset number.

Further, the random number is used in the above process of calculating the time sampling score of each query; the random number is any value from 0 to 1; when the final time sampling score is calculated, the time sampling score of a query occurring recently is not necessarily higher than the time sampling score of a query occurring earlier, so that the probability of the query searched recently by the user being sampled is higher, while the query searched long ago by the user can still be retained, so that the finally used sampled query data can represent the voice information of the user as much as possible, thereby improving the distinction between the users.

It shall be understood that one of the frequency-based sampling manner and the time-based sampling manner may be used for processing, or both the frequency-based sampling manner and the time-based sampling manner may be used for processing.

If both the frequency-based sampling manner and the time-based sampling manner may be used for processing, K queries may be acquired in the frequency-based sampling manner; L queries may be acquired in the time-based sampling manner; and then K queries and L queries are combined to obtain the sampled query data with the first preset number.

The first preset number may be equal to K or L, or may be another value, which is not limited here.

The K queries and L queries may be deduplicated in the combined process. If one query appears in both the two results, one item of the query is deleted and the remaining item is retained, to ensure that there is no repeated information in the sampled query data with the first preset number.

The above is the processing for the query set; in the next processing for the title set, the operation of performing sampling on the title set corresponding to the i-th user to obtain at least one sampled title data may include:

calculating, based on a number of occurrences of a title in the title set of the i-th user among the N users and a random number, a frequency sampling score corresponding to the title; and selecting top H titles with largest frequency sampling scores as the at least one sampled title data, wherein H is an integer greater than or equal to 1;

and/or, acquiring a time stamp of the title in the title set of the i-th user among the N users and a time difference at a current moment, calculating, based on the time difference and the random number, a time sampling score corresponding to the title, and selecting top G titles with smallest time sampling scores as the at least one sampled title data, wherein G is an integer greater than or equal to 1.

The manner for obtaining the number of occurrences of the title has been described in the above embodiment, and will not be repeated.

The design principle of the frequency-based sampling is: the title frequently searched by the user has a higher probability of being sampled, while the title that has been searched for once or twice by the user cannot be discarded.

Specifically, the following formula may be used:

$$Score\_tf = random(0,1) * count(title);$$

where random(0, 1) is a random number from 0 to 1; count( ) refers to the number of occurrences of a certain title; and Score_tf represents the frequency sampling score.

The frequency sampling score of each title may be calculated based on the above formula; then top H queries with highest frequency sampling scores may be selected as the final sampled title data.

Further, a random number is used in the above process of calculating the frequency sampling score of each viewed title; the random number is any value from 0 to 1; when the final frequency sampling score is calculated, the frequency sampling score of a viewed title with a larger number of occurrences is not necessarily higher than the frequency sampling score of a viewed title with a smaller number of occurrences, so that the probability of the title viewed frequently by the user being sampled is higher, while the title viewed for once or twice by the user can still be retained, so that the finally used sampled title data can represent the voice information of the user as much as possible, thereby improving the distinction between the users.

The design principle of the time-based sampling is: the title of the web page that is recently viewed by the user has a high probability of being sampled, while the title of the web page that is viewed by the user long ago cannot be discarded. Specifically, the following formula may be used for calculation:

$$Score\_time = random(0,1) * (cur\_time - title\_time)$$

cur_time may be a current moment, or may be a time stamp corresponding to a current sampling time; query_time is a time stamp when the title is being viewed; Score_time is a time sampling score.

It shall be noted here that title_time is the time stamp of the title. If a certain title appears only once, the time stamp is the moment when the title appears; if a certain title appears for twice or more times, title_time refers to the time stamp corresponding to the time when the title is recorded for the last time, namely, the recent time stamp.

The time sampling score of each viewed title may be calculated based on the above formula; then top G titles with smallest time sampling scores may be selected as at least one final sampled title data.

Here, H and G may be the same or different, for example, they may be the same, that is, they are equal to a second preset number.

Further, the random number is used in the above process of calculating the time sampling score of each title; the random number is any value from 0 to 1; when the final time sampling score is calculated, the time sampling score of the title appearing recently is not necessarily lower than the time sampling score of the title appearing earlier, so that the probability of the title of the web page viewed by the user recently being sampled is higher, while the title of the web page viewed by the user long ago can still be retained, so that the finally used sampled title data can represent the voice information of the user as much as possible, thereby improving the distinction between the users.

It shall be understood that one of the frequency-based sampling manner and the time-based sampling manner may be used for processing, or both the frequency-based sampling manner and the time-based sampling manner may be used for processing.

If both the frequency-based sampling manner and the time-based sampling manner may be used for processing, H titles may be acquired in the frequency-based sampling manner; G titles may be acquired in the time-based sampling manner; and then H titles and G titles are combined to obtain the sampled title data with the second preset number.

The second preset number may be equal to G or H, or may be another value, which is not limited here.

It shall also be noted that the final sampled text data of the i-th user may include part of the sampled title data and part of the sampled query data. The specific number of each part may be set according to the actual situation. For example, it may be 50%, there are 50 sampled title data and 50 sampled query data; or one part has a larger number, and the other part has a smaller number, which will not be exhaustive in this embodiment.

The operation of determining the semantic vector corresponding to the N users based on the sampled text data respectively corresponding to the N users includes: generating the corresponding sentence vector based on the sampled text data of the i-th user among the N users, and generating the semantic vector of the i-th user based on the sentence vector.

That is, the sentence vector is firstly generated from the sampled text data of each user. The sentence vector may be generated by using an open source model such as the Enhanced Language Representation with Informative Entities (ERNIE) model.

Specifically, the sampled text data of the i-th user is input into the first model one by one, and the sentence vector of each sampled text data output by the first model is obtained.

That is, the sentence vector of each sampled text data may be obtained by using the first model to process each sampled text data, so as to obtain the sentence vector of each sampled text data.

The operation of generating the semantic vector corresponding to each user based on the sentence vector of each sampled text data may include: taking all sentence vectors of the i-th user as a sentence vector set, then performing sum pooling or mean pooling calculation on the sentence vector set of the i-th user to generate one semantic vector that may represent the i-th user. Here, since the acquired historical text data of the user is within the preset duration, the finally obtained semantic vector may include the semantic information of the user within the preset duration.

A plurality of sentence vectors are calculated to obtain the semantic vector of the i-th user, and the semantic information of the i-th user is represented by the semantic vector.

Finally, the semantic relationship network composed of N users is generated based on the semantic vector of each of the N users.

Thus, through data sampling performed by the method provided in this embodiment, the distinction of the users can be ensured; the semantic vector is generated based on the sampled text data. Representation of the user and reflection of the distinction can be achieved by processing a smaller amount of data, which therefore reduces the calculation amount of text vectorization effectively.

Figure 4:
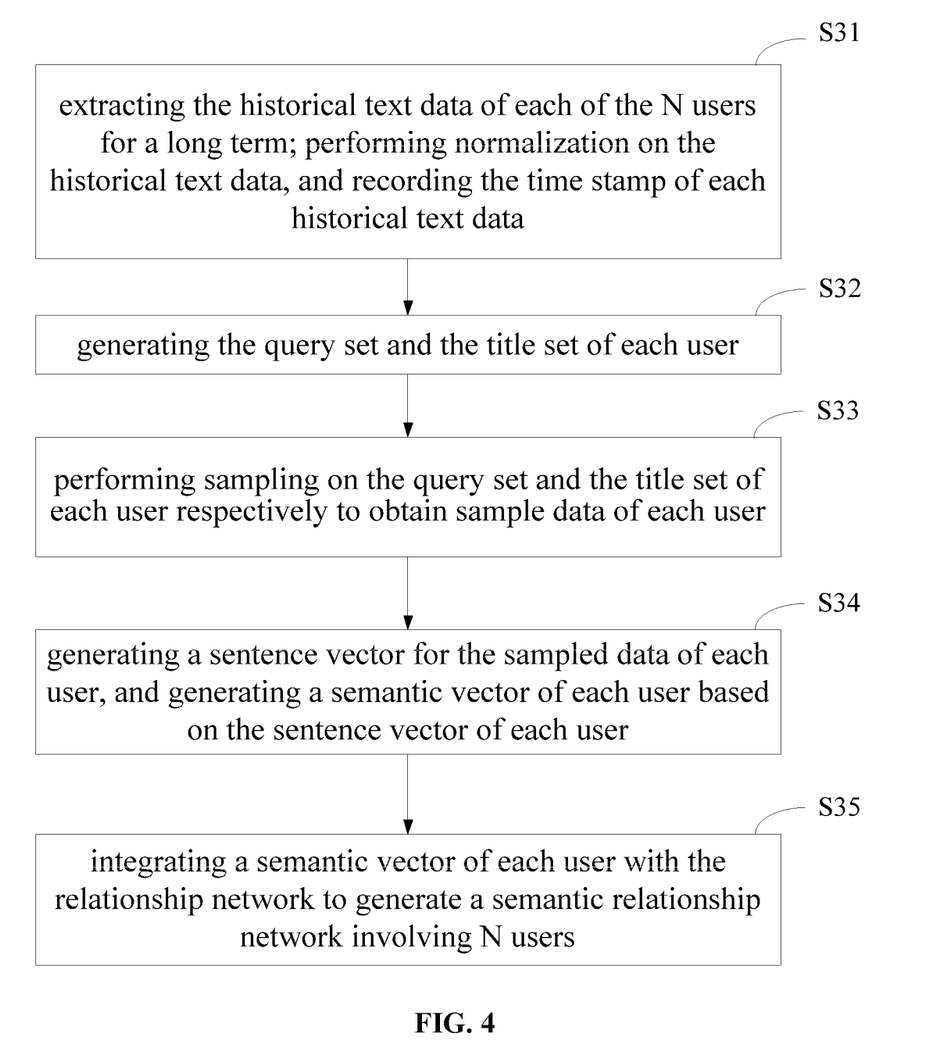
FIG. 4 is a flowchart II of a relationship network generation method according to an embodiment of the present application.

The present disclosure provides an exemplary description of the application, as shown in FIG. 4, which includes:

S31: extracting the historical text data of each of the N users for a long term (one year); performing normalization processing on the historical text data, and recording the time stamp of each historical text data.

The historical text data includes the query and the title.

The record time stamp may be a time stamp for recording each historical text data. It shall be pointed out that some historical text data may be combined after the normalization. At this time, the last time stamp may be recorded, or all the time stamps occurred may be recorded.

The operation of recording the number of occurrences of each historical text data for each user may specifically include: recording a number of occurrences of a query and a number of occurrences of a title.

In S32, the query set and the title set of each user are generated.

In S33, sampling is performed on the query set and the title set of each user to obtain the sampled data of each user. The sampled data includes the sampled query data and the sampled title data.

There are two sampling methods, and at least one of the following two methods may be used.

Frequency-based Sampling: the query that is frequently searched by the user has a higher probability of being sampled, but the query that has been searched for once or twice by the user cannot be discarded;

$$Score\_tf = random(0,1) * count(query);$$

Random(0, 1) is a random number from 0 to 1;

Sorting is performed according to Score_tf, and the top multiple samples with largest frequency sample values are taken as the sampled query data.

The same processing method is adopted for the title; and it has been explained in the above second embodiment and will not be repeated here.

Time-based sampling: the query that is recently searched by the user has a higher probability of being sampled, but the query that has been searched long ago by the user cannot be discarded;

$$Score\_time = random(0,1) * (cur\_time - query\_time)$$

Cur_time is a time stamp of a current sampling; query_time is a time stamp of a query (a recent time stamp); sorting is performed according to Score_time, and the top multiple samples with smallest time sampling values are taken as the sampled query data.

The same processing method is adopted for the title; and it has been explained in the above second embodiment and will not be repeated here.

In S34, a sentence vector is generated for the sampled data of each user, and a semantic vector of each user is generated based on the sentence vector of each user.

There are various method for generating the sentence vector. Open source models such as ERNIE may be used. Then sum pooling or mean pooling calculation is performed on the sentence vector set of each user to generate a vector that may represent the user. This vector is a semantic vector of the use, which includes the long-term semantic information of the user.

In S35, the semantic vector of each user is integrated with the relationship network to generate a semantic relationship network involving N users. The relationship network has been described in the above first embodiment and will not be repeated. The operation of integrating semantic vector of each user with the relationship network may include: taking the semantic vector as the characteristic attribute of the node corresponding to each user in the relationship network to perform the integration, and finally obtaining the semantic relationship network comprising the semantic vector information of each user.

Figure 5:
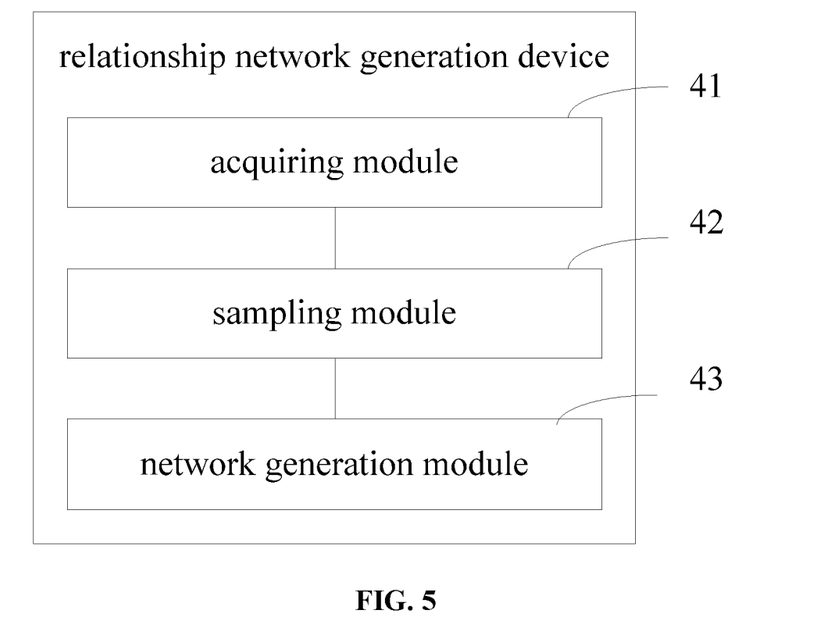
FIG. 5 is a block diagram of a structure of a relationship network generation device according to an embodiment of the present application.

The third embodiment of the present application provides a relationship network generation device. As shown in FIG. 5, the device includes an acquiring module 41, a sampling module 42, and network generation module 43.

The acquiring module 41 is configured to acquire at least one historical text data corresponding to N users within a preset duration. N is an integer greater than or equal to 1.

The sampling module 42 is configured to perform sampling on at least one historical text data corresponding to the N users to obtain sampled text data corresponding to the N users.

The network generation module 43 is configured to determine semantic vectors corresponding to the N users respectively based on the sampled text data corresponding to the N users respectively, and generate the semantic relationship network involving the N users based on the semantic vectors corresponding to the N users respectively.

The historical text data includes the query and the title.

Correspondingly, the acquiring module 41 is configured to acquire at least one query and at least one title of an i-th user among the N users within the preset duration, and generate a query set and a title set corresponding to the i-th user based on at the least one query and the at least one title of each user within the preset duration.

The sampling module 42 is configured to perform sampling on the query set corresponding to the i-th user among the N users to obtain at least one sampled query data, and perform sampling on the title set corresponding to i-th user to obtain at least one sampled title data; and take the at least one sampled query data and the at least one sampled title data of the i-th user as the sampled text data of the i-th user.

The sampling module 42 is configured to calculate, based on a number of occurrences of a query in the query set of the i-th user among the N users and a random number, a frequency sampling score corresponding to the query, and select top K queries with largest frequency sampling scores as at least one sampled query data. K is an integer greater than or equal to 1.

Additionally or alternatively, the acquiring module is configured to acquire a time stamp of the query in the query set of the i-th user among the N users and a time difference at a current moment, calculate based on the time difference and the random number, a time sampling score corresponding to the query, and select top L queries with smallest time sampling scores as at least one sampled query data. L is an integer greater than or equal to 1.

The sampling module 42 is configured to calculate, based on a number of occurrences of a title in the title set of the i-th user among the N users and a random number, a frequency sampling score corresponding to the title, and select top H titles with largest frequency sampling scores as the at least one sampled title data. H is an integer greater than or equal to 1;

Additionally or alternatively, the acquiring module is configured to acquire a time stamp of the title in the title set of the i-th user among the N users and a time difference at a current moment; calculate, based on the time difference and the random number, a time sampling score corresponding to the title, and select top G titles with smallest time sampling scores as the at least one sampled title data. G is an integer greater than or equal to 1.

The network generation module 43 is configured to generate, based on the sampled text data of the i-th user among the N users, a sentence vector corresponding to the i-th user, and generate a semantic vector of the i-th user based on the sentence vector.

The device provided in the third embodiment of the present application can implement the methods provided in the first and second embodiments of the present application and has corresponding beneficial effects.

According to an embodiment of the present application, the present application further provides electronic equipment and a readable storage medium.

Figure 6:
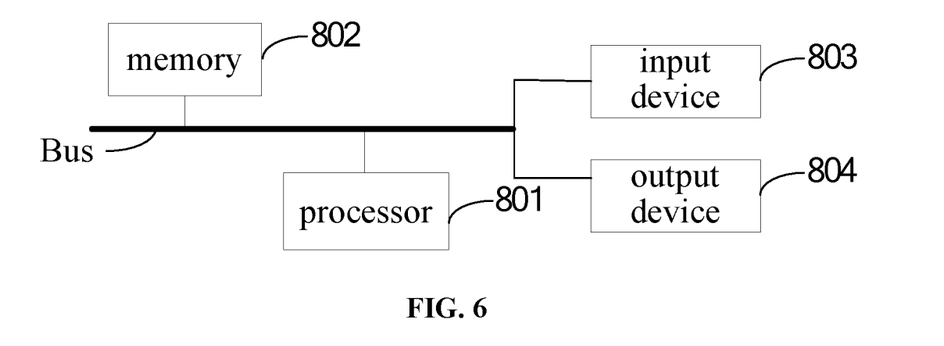
FIG. 6 is a block diagram of electronic equipment for implementing the relationship network generation method of an embodiment of the present application.

As shown in FIG. 6, it is a block diagram of electronic equipment of a relationship network generation method according to an embodiment of the present application. The electronic equipment may be the above deployment equipment or proxy equipment. The electronic equipment is intended to represent various forms of digital computers, such as laptop computers, desktop computers, workstations, personal digital assistants, servers, blade servers, mainframe computers, and other suitable computers. The electronic equipment may also represent various forms of mobile devices, such as personal digital processing, cell phones, smart phones, wearable equipment and other similar computing devices. The components shown herein, their connections and relationships, and their functions are examples only; and are not intended to limit the implementation of the present disclosure described and/or required herein.

As shown in FIG. 6, the electronic equipment includes: one or a plurality of processors 801, a memory 802 and interfaces for connecting various components, comprising a high-speed interface and a low-speed interface. The various components are connected to each other by using different buses, and may be installed on a common motherboard or installed by other methods according to the demands. The processors may process instructions executed in the electronic equipment, comprising the instructions stored in or on the memory to display graphical information of the GUI on an external input/output device (such as display equipment coupled to the interface). If necessary, the plurality of processors and/or the plurality of buses may be used with a plurality of memories in other embodiments. Similarly, the plurality of electronic equipment may be connected; and each piece of equipment provides some necessary operations (for example, as a server array, a group of blade servers, or a multi-processor system). FIG. 6 takes one processor 801 as an example.

The memory 802 is a non-instantaneous computer readable storage medium provided by the present application, wherein the memory stores instructions executed by at least one processor, so that the at least one processor executes the relationship network generation method provided by the present application. The non-instantaneous computer readable storage medium of the present application stores computer instructions, which are used to make a computer execute the relationship network generation method provided by the present application.

As the non-instantaneous computer readable storage medium, the memory 802 may be used to store non-instantaneous software programs, non-instantaneous computer executable programs and modules, such as program instructions/modules corresponding to the relationship network generation method in the embodiments of the present application (For example, the acquiring module 41, the sampling module 42 and the network generation module 43 as shown in FIG. 5). The processor 801 executes various functional applications and data processing of the server by the non-instantaneous software programs, instructions and modules stored in the memory 42, namely, the relationship network generation method in the above embodiments is implemented.

The memory 802 may include a storage program area and a storage data area, wherein the storage program area may store an operation system and an application program required by at least one function; the storage data area may store data created according to the use of the electronic equipment. In addition, the memory 802 may include a high-speed random access memory, and may also include a non-instantaneous memory, such as at least one magnetic disk memory device, a flash memory device, or other non-instantaneous solid-state memory device. In some embodiments, the memory 802 optionally includes a memory remotely arranged relatively to the processor 801, and these remote memories may be connected to the electronic equipment by the network. Examples of the above networks include, but are not limited to, the Internet, corporate intranets, local area networks, mobile communication networks, and combinations thereof.

The electronic equipment of the relationship network generation method may include: an input device 803 and an output device 804. The processor 801, the memory 802, the input device 803 and the output device 804 may be connected by the bus or other methods. The bus connection is taken an example in FIG. 6.

The input device 803 may receive input digital or character information, and generate key signal input related to the user settings and function control of the electronic equipment, such as touch screen, keypad, mouse, trackpad, touchpad, pointer, one or a plurality of mouse buttons, trackballs, operating levers and other input devices. The output device 804 may include display equipment, an auxiliary lighting device (such as LED), a tactile feedback device (such as a vibration motor), etc. The display equipment may include, but is not limited to, a liquid crystal display (LCD), a light emitting diode (LED) display and a plasma display. In some embodiments, the display equipment may be a touch screen.

Various implementations of the systems and techniques described herein may be implemented in digital electronic circuit systems, integrated circuit systems, ASIC (application-specific integrated circuit), computer hardware, firmware, software, and/or combinations thereof. These various embodiments may include: one or the plurality of computer programs may be executed and/or interpreted on a programmable system including at least one programmable processor in one or the plurality of computer programs; the programmable processor may be a special or general programmable processor; data and instructions may be received from the storage system, at least one input device and at least one output device; the data and instructions are transmitted to the storage system, at least one input device and at least one output device.

These calculation programs (also called programs, software, software applications, or codes) include machine instructions for programmable processors, and may implement these calculation programs by using the advanced process and/or object-oriented programming languages, and/or assembly/machine language. As used herein, the terms "machine readable medium" and "computer readable medium" refer to any computer program product, equipment, and/or device used to provide machine instructions and/or data to a programmable processor (such as magnetic disks, optical disks, memory, programmable logic devices (PLD)), comprising machine readable medium that receives machine instructions as machine readable signals. The term "machine readable signal" refers to any signal used to provide machine instructions and/or data to the programmable processor.

In order to provide interaction with the user, the system and technology described here may be implemented on a computer. The computer has a display device for displaying information to the user (such as CRT (Cathode Ray Tube) or LCD (Liquid Crystal Display)) monitor); and a keyboard and pointing device (such as a mouse or trackball); and the user may provide input to the computer by the keyboard and pointing device. Other types of devices may also be used to provide interaction with the user; for example, the feedback provided to the user may be any form of sensory feedback (such as visual feedback, auditory feedback, or tactile feedback); and the input from the user may be received in any form (comprising acoustic input, voice input, or tactile input).

The systems and technologies described herein may be implemented in computing systems that include back-end components (for example, as data servers), or computing systems that include middleware components (for example, application servers), or computing systems that include front-end components (for example, a user computer with a graphical user interface or a web browser through which the user may interact with the implementation of the system and technology described herein), or computing systems comprising any combination of the back-end components, intermediate components and front-end components. The components of the system may be connected to each other through any form or medium of digital data communication (for example, communication network). Examples of communication networks include: local area network (LAN), wide area network (WAN), and the Internet.

The computer system may include a client and a server. The client and server are generally far away from each other and usually interact through the communication network. The relationship between the client and the server is generated through computer programs running on the corresponding computers and having a client-server relationship. The server may be a cloud server, also known as a cloud computing server or cloud host. It is a host product in the cloud computing service system to solve the difficult management and business expansibility in the traditional physical host and virtual private server (VPS) services.

According to the technical solutions of the embodiments of the present application, sampling of the text data in a large amount of historical text data within the preset duration can be performed, the information of the user in a long time range can be covered; and the semantic vector of the user is generated based on the sampled text data. Thus, the calculation amount of text vectorization can be effectively reduced, while the long-term semantic information of the user can be retained; the distinction between users can be effectively reflected, so that the finally established semantic relationship network can represent the semantic information of the user, and ensure that the distinction of each user is reflected in the semantic relationship network.

It shall be understood that the various forms of processes shown above can be used to the steps of reordering, adding or deleting. For example, the steps described in the present application can be executed in parallel, sequentially, or in a different order as long as the desired result of the technical solution disclosed in the present application can be achieved; and it is not limited herein.

The above implementations do not constitute a limitation to the protection scope of the present application. Those skilled in the art shall understand that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A relationship network generation method, implemented by circuits for implementing functions, comprising:
    acquiring at least one historical text data corresponding to each of N users within a preset duration, wherein N is an integer greater than 1; wherein the historical text data is text data that has occurred within the preset duration;
    performing sampling on the at least one historical text data corresponding to each of the N users to obtain sampled text data corresponding to each of the N users; wherein a part of the historical text data is acquired from the historical text data of one user of the N users within the preset duration as the sampled text data of the user; and
    determining semantic vectors corresponding to the N users respectively based on the sampled text data corresponding to each of the N users, and generating a semantic relationship network involving the N users based on the semantic vectors corresponding to the N users, respectively; wherein each of the N users is taken as a node, and interaction behaviors between the N users are taken as sides to form the semantic relationship network;
    wherein the determining the semantic vectors corresponding to the N users respectively based on the sampled text data corresponding to each of the N users, respectively, comprises:
    generating, based on the sampled text data of the i-th user among the N users, a sentence vector corresponding to the i-th user by using an Enhanced Language Representation with Informative Entities model; and generating a semantic vector of the i-th user based on the sentence vector; wherein all sentence vectors of the i-th user are taken as a sentence vector set, and sum pooling or mean pooling calculation is performed on the sentence vector set of the i-th user to generate one semantic vector that represents the i-th user; wherein the semantic vector corresponding to the i-th user comprises semantic information of the i-th user within the preset duration.

2. The method according to claim 1, wherein the historical text data comprises query and title; and correspondingly, the method further comprises:

acquiring at least one query and at least one title of an i-th user among the N users within the preset duration, wherein i is an integer greater than or equal to 1 and less than or equal to N; and generating a query set and a title set corresponding to the i-th user based on the at least one query and the at least one title of the i-th user within the preset duration.

3. The method according to claim 2, wherein the performing sampling on at least one historical text data corresponding to each of the N users to obtain sampled text data corresponding to the N users comprises:

performing sampling on the query set corresponding to the i-th user among the N users to obtain at least one sampled query data, and performing sampling on the title set corresponding to the i-th user to obtain at least one sampled title data; and taking the at least one sampled query data and the at least one sampled title data of the i-th user as sampled text data of the i-th user.

4. The method according to claim 3, wherein the performing sampling on the query set corresponding to the i-th user among the N users to obtain at least one sampled query data comprises:

calculating, based on a number of occurrences of a query in the query set of the i-th user among the N users and a random number, a frequency sampling score corresponding to the query, and selecting top K queries with largest frequency sampling scores as the at least one sampled query data, wherein K is an integer greater than or equal to 1;

and/or acquiring a time stamp of the query in the query set of the i-th user among the N users and a time difference at a current moment, calculating, based on the time difference and the random number, a time sampling score corresponding to the query, and selecting top L queries with smallest time sampling scores as the at least one sampled query data, wherein L is an integer greater than or equal to 1.

5. The method according to claim 3, wherein the performing sampling on the query set corresponding to the i-th user among the N users to obtain at least one sampled query data comprises:

calculating, based on a number of occurrences of a title in the title set of the i-th user among the N users and a random number, a frequency sampling score corresponding to the title, and selecting top H titles with largest frequency sampling scores as the at least one sampled title data, wherein H is an integer greater than or equal to 1;

and/or acquiring a time stamp of the title in the title set of the i-th user among the N users and a time difference at a current moment, calculating, based on the time difference and the random number, a time sampling score corresponding to the title, and selecting top G titles with smallest time sampling scores as the at least one sampled title data, wherein G is an integer greater than or equal to 1.

6. A relationship network generation device, implemented by circuits for implementing functions, comprising:

at least one processor; and a memory communicatively connected to the at least one processor, wherein the memory stores instructions executable by the at least one processor, the instructions are executed by the at least one processor to enable the at least one processor to:

acquire at least one historical text data corresponding to each of N users within a preset duration, wherein N is an integer greater than 1; wherein the historical text data is text data that has occurred within the preset duration;

perform sampling on at least one historical text data corresponding to each of the N users to obtain sampled text data corresponding to each of the N users; wherein a part of the historical text data is acquired from the historical text data of one user of the N users within the preset duration as the sampled text data of the user; and determine semantic vectors corresponding to the N users respectively based on the sampled text data corresponding to each of the N users, and generate a semantic relationship network involving the N users based on the semantic vectors corresponding to the N users respectively; wherein each of the N users is taken as a node, and interaction behaviors between the N users are taken as sides to form the semantic relationship network;

wherein the instructions are executed by the at least one processor to further enable the at least one processor to generate, based on the sampled text data of the i-th user among the N users, a sentence vector corresponding to the i-th user by using an Enhanced Language Representation with Informative Entities model, and generate a semantic vector of the i-th user based on the sentence vector; wherein all sentence vectors of the i-th user are taken as a sentence vector set, and sum pooling or mean pooling calculation is performed on the sentence vector set of the i-th user to generate one semantic vector that represents the i-th user; wherein the semantic vector corresponding to the i-th user comprises semantic information of the i-th user within the preset duration.

7. The device according to claim 6, wherein the historical text data comprises: query and title; and the instructions are executed by the at least one processor to further enable the at least one processor to acquire at least one query and at least one title of an i-th user among the N users within the preset duration, and generate a query set and a title set corresponding to the i-th user based on at the least one query and the at least one title of each user within the preset duration.

8. The device according to claim 7, wherein the instructions are executed by the at least one processor to further enable the at least one processor to perform sampling on the query set corresponding to the i-th user among the N users to obtain at least one sampled query data, and perform sampling on the title set corresponding to i-th user to obtain at least one sampled title data; and take the at least one sampled query data and the at least one sampled title data of the i-th user as the sampled text data of the i-th user, wherein i is an integer greater than or equal to 1 and less than or equal to N.

9. The device according to claim 8, wherein the instructions are executed by the at least one processor to further enable the at least one processor to:

calculate, based on a number of occurrences of a query in the query set of the i-th user among the N users and a random number, a frequency sampling score corresponding to the query, and select top K queries with largest frequency sampling scores as at least one sampled query data, wherein K is an integer greater than or equal to 1;

and/or, acquire a time stamp of the query in the query set of the i-th user among the N users and a time difference at a current moment, calculate based on the time difference and the random number, a time sampling score corresponding to the query, and select top L queries with smallest time sampling scores as at least one sampled query data, wherein L is an integer greater than or equal to 1.

10. The device according to claim 8, wherein the instructions are executed by the at least one processor to further enable the at least one processor to:

calculate, based on a number of occurrences of a title in the title set of the i-th user among the N users and a random number, a frequency sampling score corresponding to the title, and select top H titles with largest frequency sampling scores as the at least one sampled title data, wherein H is an integer greater than or equal to 1;

and/or, acquire a time stamp of the title in the title set of the i-th user among the N users and a time difference at a current moment; calculate, based on the time difference and the random number, a time sampling score corresponding to the title, and select top G titles with smallest time sampling scores as the at least one sampled title data, wherein G is an integer greater than or equal to 1.

11. A non-transitory computer-readable storage medium for storing computer instructions implemented by circuits for implementing functions, wherein the computer instructions, when executed by a computer, cause the computer to:

acquire at least one historical text data corresponding to each of N users within a preset duration, wherein N is an integer greater than 1; wherein the historical text data is text data that has occurred within the preset duration;

perform sampling on the at least one historical text data corresponding to each of the N users to obtain sampled text data corresponding to each of the N users; wherein a part of the historical text data is acquired from the historical text data of one user of the N users within the preset duration as the sampled text data of the user; and determine semantic vectors corresponding to the N users respectively based on the sampled text data corresponding to each of the N users, and generate a semantic relationship network involving the N users based on the semantic vectors corresponding to the N users, respectively; wherein each of the N users is taken as a node, and interaction behaviors between the N users are taken as sides to form the semantic relationship network;

wherein the computer instructions, when executed by a computer, further cause the computer to:

generate, based on the sampled text data of the i-th user among the N users, a sentence vector corresponding to the i-th user by using an Enhanced Language Representation with Informative Entities model; and generate a semantic vector of the i-th user based on the sentence vector; wherein all sentence vectors of the i-th user are taken as a sentence vector set, and sum pooling or mean pooling calculation is performed on the sentence vector set of the i-th user to generate one semantic vector that represents the i-th user; wherein the semantic vector corresponding to the i-th user comprises semantic information of the i-th user within the preset duration.

12. The non-transitory computer-readable storage medium according to claim 11, wherein the historical text data comprises query and title, and the computer instructions, when executed by a computer, further cause the computer to:

acquire at least one query and at least one title of an i-th user among the N users within the preset duration, wherein i is an integer greater than or equal to 1 and less than or equal to N; and generate a query set and a title set corresponding to the i-th user based on the at least one query and the at least one title of the i-th user within the preset duration.

13. The non-transitory computer-readable storage medium according to claim 12, wherein the computer instructions, when executed by a computer, further cause the computer to:

perform sampling on the query set corresponding to the i-th user among the N users to obtain at least one sampled query data, and perform sampling on the title set corresponding to the i-th user to obtain at least one sampled title data; and take the at least one sampled query data and the at least one sampled title data of the i-th user as sampled text data of the i-th user.

14. The non-transitory computer-readable storage medium according to claim 13, wherein the computer instructions, when executed by a computer, further cause the computer to:

calculate, based on a number of occurrences of a query in the query set of the i-th user among the N users and a random number, a frequency sampling score corresponding to the query, and select top K queries with largest frequency sampling scores as the at least one sampled query data, wherein K is an integer greater than or equal to 1;

and/or acquire a time stamp of the query in the query set of the i-th user among the N users and a time difference at a current moment, calculate, based on the time difference and the random number, a time sampling score corresponding to the query, and select top L queries with smallest time sampling scores as the at least one sampled query data, wherein L is an integer greater than or equal to 1.

15. The non-transitory computer-readable storage medium according to claim 13, wherein the computer instructions, when executed by a computer, further cause the computer to:

calculate, based on a number of occurrences of a title in the title set of the i-th user among the N users and a random number, a frequency sampling score corresponding to the title, and select top H titles with largest frequency sampling scores as the at least one sampled title data, wherein H is an integer greater than or equal to 1;

and/or acquire a time stamp of the title in the title set of the i-th user among the N users and a time difference at a current moment, calculate, based on the time difference and the random number, a time sampling score corresponding to the title, and select top G titles with smallest time sampling scores as the at least one sampled title data, wherein G is an integer greater than or equal to 1.

\* \* \* \* \*